Figure 1:
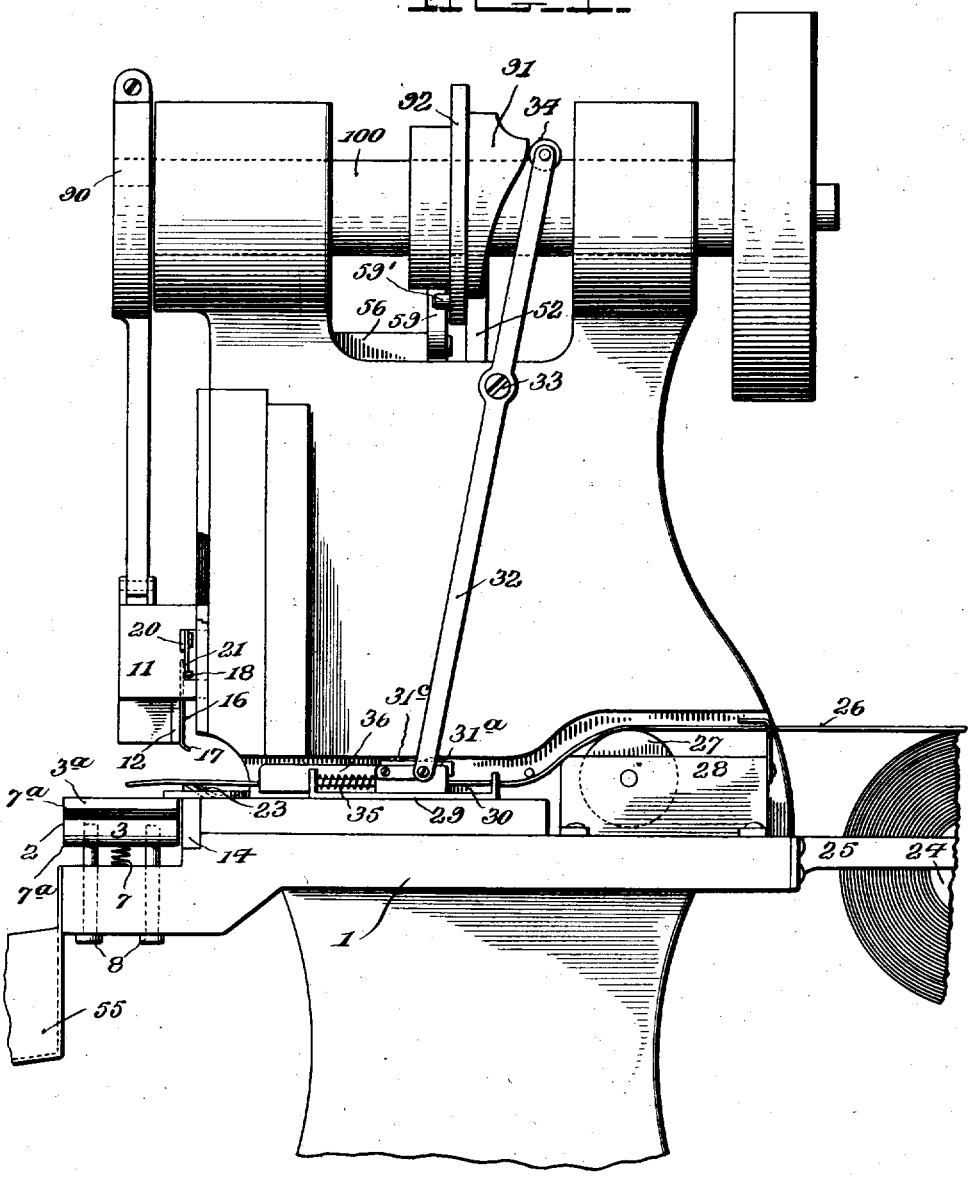

F. L. ANDERSON.

EYELET STAY JOINING MACHINE.

APPLICATION FILED MAR. 1, 1911.

Reissued May 14, 1912.

13,416.

5 SHEETS—SHEET 1.

Witnesses

Helgell T. Murray.

A. P. Roberts

Inventor

Frederick L. Anderson, by C. A. Mason Attorney

COLUMBIA PLANOGRAPH CO., WASHINGTON, D. C.

F. L. ANDERSON.

EYELET STAY JOINING MACHINE.

APPLICATION FILED MAR. 1, 1911.

Reissued May 14, 1912.

13,416.

5 SHEETS—SHEET 2.

Witnesses

Helen A. Murray

H. P. Roberts.

Inventor

Frederick L. Anderson, by C. A. Mason

Attorney

COLUMBIA PLANOGRAPH CO., WASHINGTON, D. C.

F. L. ANDERSON.

EYELET STAY JOINING MACHINE.

APPLICATION FILED MAR. 1, 1911.

Reissued May 14, 1912.

13,416.

5 SHEETS—SHEET 3.

Witnesses

Helsel H. Murray.

H. P. Roberts.

Inventor

Frederick L. Anderson, by C. A. Mason Attorney

COLUMBIA PLANOGRAPH CO., WASHINGTON, D. C.

F. L. ANDERSON.

EYELET STAY JOINING MACHINE.

APPLICATION FILED MAR. 1, 1911.

Reissued May 14, 1912. 13,416.

5 SHEETS—SHEET 4.

Witnesses

Helge A. H. Murray.

H. P. Roberts.

Inventor

Frederick L. Anderson, by C. S. Mason Attorney

COLUMBIA PLANOGRAPH CO., WASHINGTON, D. C.

F. L. ANDERSON.

EYELET STAY JOINING MACHINE.

APPLICATION FILED MAR. 1, 1911.

Reissued May 14, 1912.

13,416.

5 SHEETS—SHEET 5.

Witnesses

Helgeth Murray.

H. P. Roberts.

Inventor.

Frederick L. Anderson, by C. A. Mason, Attorney

COLUMBIA PLANOGRAPH CO., WASHINGTON, D. C.

UNITED STATES PATENT OFFICE.

FREDERICK L. ANDERSON, OF BEVERLY, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

EYELET-STAY-JOINING MACHINE.

13,416. Specification of Reissued Letters Patent. Reissued May 14, 1912.

Original No. 913,934, dated March 2, 1909, Serial No. 414,093. Application for reissue filed March 1, 1911. Serial No. 611,729.

*To all whom it may concern:*

Be it known that I, FREDERICK L. ANDERSON, a citizen of the United States, residing at Beverly, in the county of Essex and Commonwealth of Massachusetts, have invented new and useful Improvements in Eyelet-Stay-Joining Machines, of which the following is a specification.

This invention relates to mechanism for joining or splicing the stays used to reinforce the uppers of shoes along the eyelets thereof. These stays are made in two pieces, and are joined at their abutting ends by a splicing piece or tape or by lapping the ends of the stay on each other.

The principal object of the invention is to provide a mechanism whereby the stays to be joined will be under pressure during the greater portion of the time consumed by the pressing mechanism, and whereby the maximum pressure may be obtained.

Another object of the invention is to allow two stay sections of leather or other substance to be joined together with adhesive tape to receive nearly uniform pressure during the joining operation.

Another object is to provide a simple and efficient machine of this character provided with means for automatically feeding the tape to the stays, and with automatic means for discharging the spliced stays when finished.

Figure 2:
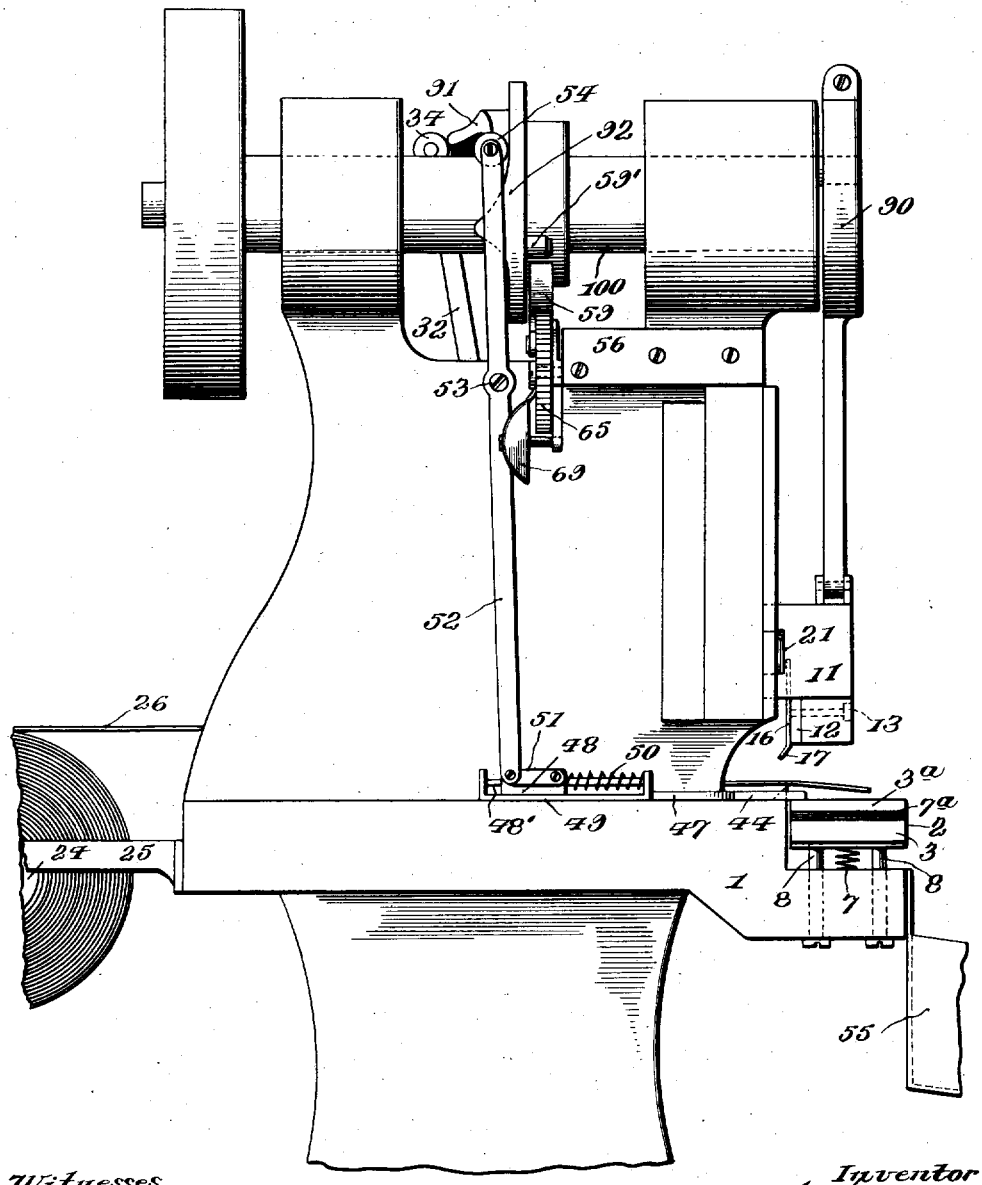
Figure 3:
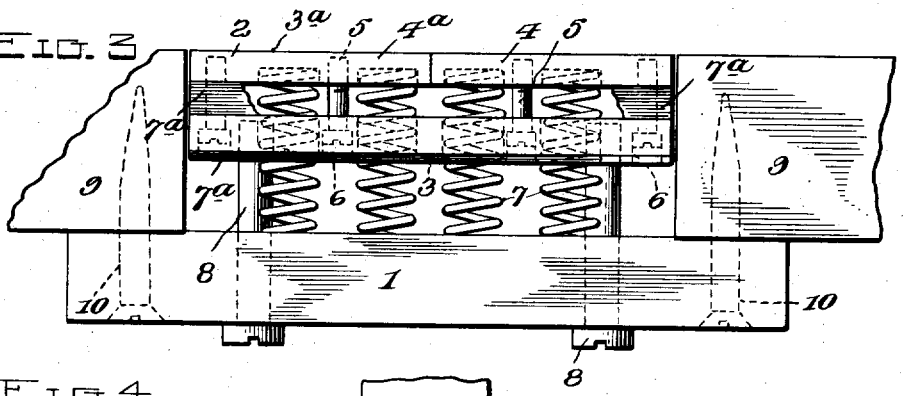
Figure 4:
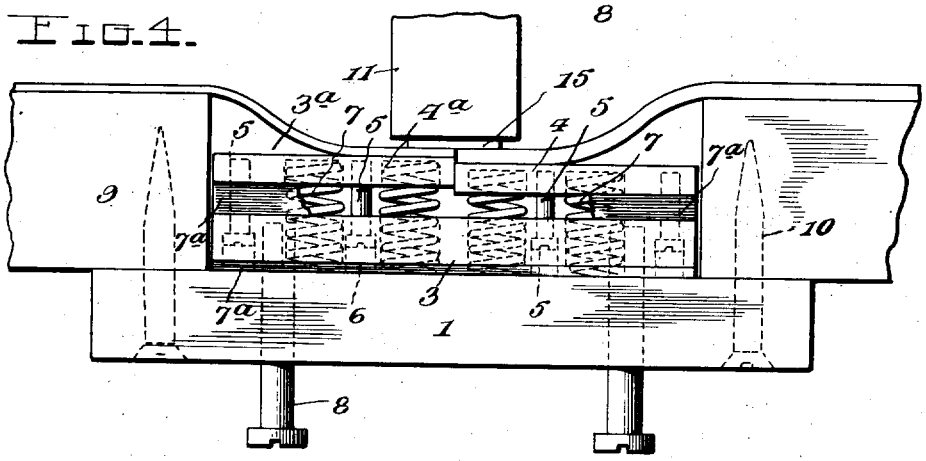
Figure 5:
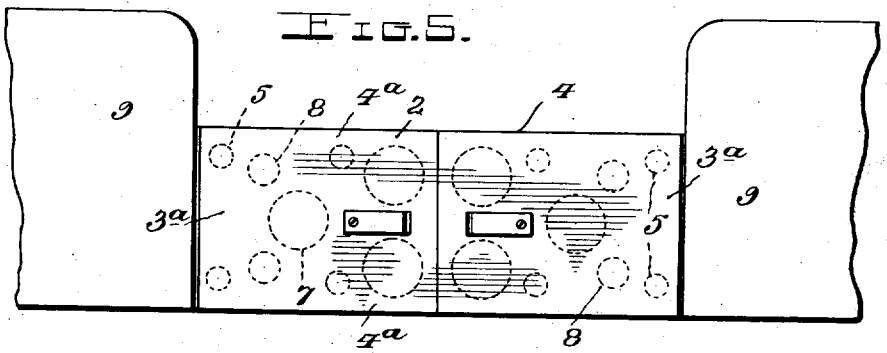
Figure 6:
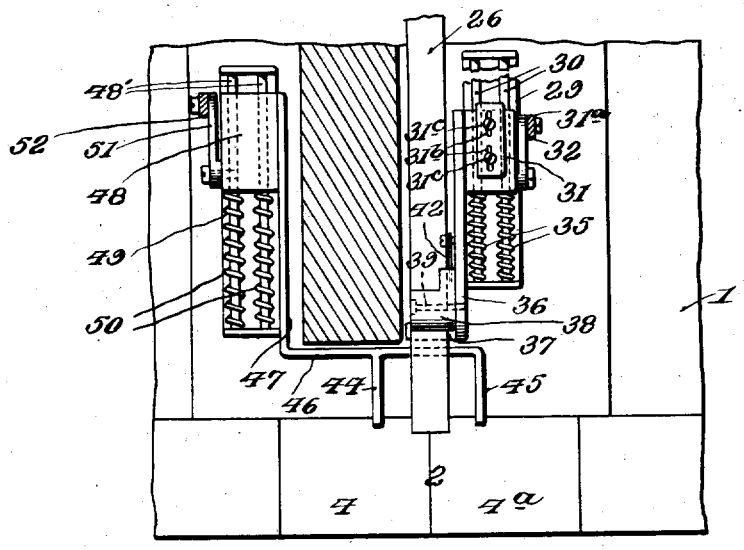
Figure 7:
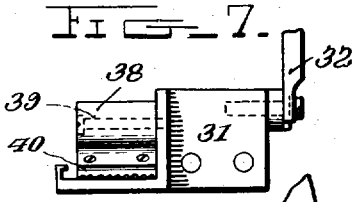
Figure 8:
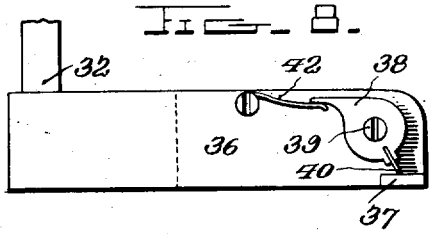
Figure 9:
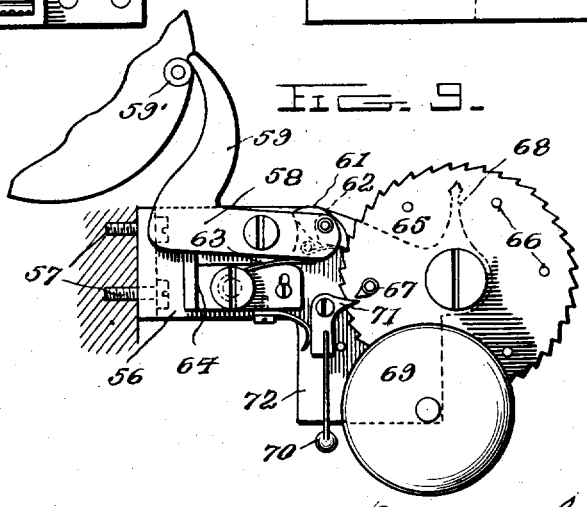
Figure 10:
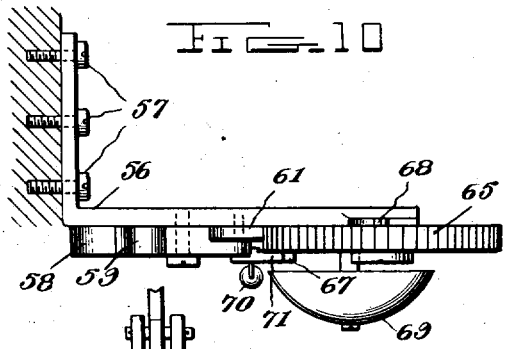
Figure 11:
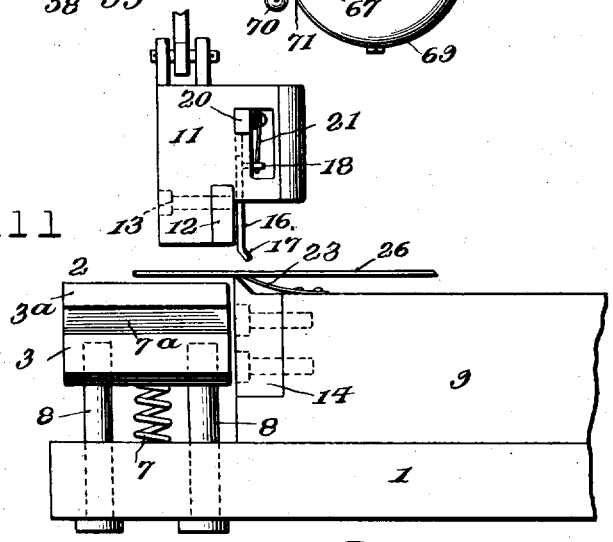
Figure 12:
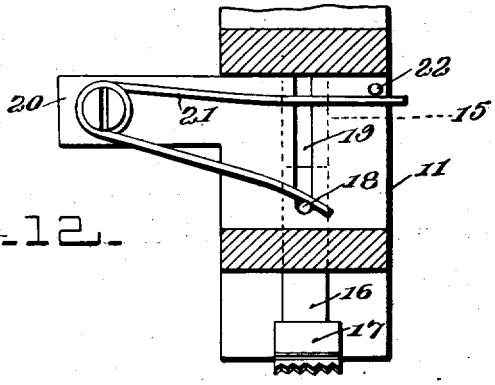

In the accompanying drawings, Figure 1 is a side elevation of this improved machine with the table removed; Fig. 2 is a similar view taken from the opposite side of the machine; Fig. 3 is a side elevation of a portion of the bed plate and pressing member or block, the latter being in elevated or inoperative position; Fig. 4 is a similar view showing the presser member in its lowered or operative position; Fig. 5 is a plan view of the member shown in Fig. 3; Fig. 6 is a top plan view showing the arrangement of the stay-discharging and tape-feeding devices; Fig. 7 is a front elevation of the tape feeder; Fig. 8 is a top plan view thereof; Fig. 9 is a rear elevation showing the stay-counting mechanism; Fig. 10 is a top plan view of said mechanism; Fig. 11 is an end view of a portion of the bed plate, presser member and plunger; and Fig. 12 is a side elevation of the lower portion of the plunger.

In the embodiment illustrated, a bed plate 1 is shown sustained in position by a supporting structure of any desired construction, and a pressing member 2 is yieldingly supported above and adapted for contact with the bed plate 1. This member 2 comprises two vertically spaced horizontally disposed plates or members 3, $3^a$, the upper one $3^a$ of which is formed by two separate sections, 4, $4^a$. Said plates 3 and $3^a$ are preferably connected by screws, as 5, which pass through the lower plate 3 and into the upper plate $3^a$, the heads of said screws 5 being arranged to slide in corresponding sockets 6 formed in the lower plate 3.

Vertically disposed coiled springs 7 are fixed to the bed plate 1 passed through corresponding openings in the lower plate 3 of the presser member and have their upper ends fitted in sockets formed in the under or lower face of the top plate $3^a$ of said member 2. By this arrangement it will be evident that the presser member 2 is yieldingly supported above the bed plate, but may be moved in contact therewith when pressure is applied thereto. Yielding means, preferably in the form of a rubber cushion or plate $7^a$, is arranged between the plates 3, $3^a$ to provide additional yielding resistance when the bottom plate 3 has reached the bed plate 1 of the machine.

Vertically disposed guide members 8, preferably in the form of screws, pass through openings in the bed plate 1 and screw into the lower plate 3 of the presser member, said screws serving as a guide for the presser member when the latter is actuated.

A table 9 is fixed at its inner end by a fastening screw 10, or other equivalent means, to the top of the bed plate 1 at each end of the presser block 2, and the stays to be joined are piled upon this table. A plunger 11 is shown provided at its rear face and lower end with a suitable die 12 which is removably retained in position by a screw 13, or other equivalent means and is adapted to cut off a section of the tape for joining the eyelet stays together. This plunger may be actuated by any suitable means preferably by an eccentric 90 on a shaft 100 driven by any suitable means.

The bed plate 1 is provided adjacent the rear side of the presser block with an upright die 14 having a sharpened upper edge, and in the application of the invention, the tape is intermittently fed by a suitable feeding mechanism, hereinafter described, over said die and onto the face of the presser member under the plunger.

The plunger 11 is provided at its rear face with a suitable guideway 15 in which is arranged to slide vertically a tape-holding member 16 having an outwardly extending serrated lower end 17 and a pin or extension 18 on its rear face adapted to operate in a slot 19 formed in the rear face of the guide member. Said guide member is provided at one edge with a horizontally disposed arm or extension 20 to which is fixed a spring 21, the upper end of said spring being arranged to engage a pin or projection 22 extending outwardly from the rear face of the guide member, and the lower or opposite end is arranged to engage the pin or extension 18 of the slide 16. The tendency of this spring 21 is to normally press downward on the pin 18 for a purpose to be described. The lower end 17 of the slide 16 is preferably in the form of a rearwardly and downwardly inclined finger adapted to engage the correspondingly inclined inner face of the free end of a flat spring 23, which is secured at its other end to the table 9 to hold the tape during the backward movement of the tape-feeding finger to be described. The finger 17 of the slide 16 normally projects below the lower face of the plunger 11 so that the tape will be gripped by the finger or extension 17 before the plunger reaches the pressing block. As soon as the finger 17 grips the tape, the slide moves upward in the guide member 15 of the plunger 11 to prevent retarding of the descent of the plunger.

A tape-carrying reel 24 is mounted on a laterally extending arm 25 at the rear of the machine. The tape 26 is wound on this reel 24 and passes over a dampening roller 27 rotatably mounted in a water tank 28 carried by the machine bed.

The tape-feeding device consists of a bracket 29 fixed on a plate on the bed plate 1 of the machine, and has its ends upturned and apertured to receive rods, as 30. A block 31 is slidably mounted on these rods 30 and is connected with one end of a cam-operated lever 32 fulcrumed at 33 to the machine head or stand, and this lever is provided with a roller 34 at its free end. Coiled springs, as 35, are arranged on the rods 30 between the front end of the block 31 and the front bracket arm, and serve to normally hold and to return the block into normal position. A member 36 is secured to one side of and adapted to move with the block 31. This member 36 is provided with a laterally extending arm 37 at its front end for a purpose to be described. A pawl 38 is fixedly mounted on a laterally extending screw 39 carried by the member 36 and is provided at its free end with a detachable serrated plate 40 preferably made of steel and adjustably secured to the pawl by screws, and this plate is designed to grip the tape and feed it forward as hereinafter described. A spring 42 bears on the pawl 38 when the slide 31 is moved forward and binds the tape tightly between the serrated edge of the pawl plate 40 and the upper face of the arm 37.

When the sliding block 31 moves backward under the action of the springs, as 35, the pawl 38 swings outward and the tape is held between the fingers 17 of the sliding plunger-carried member 16 and the serrated end of the spring 23.

The block 31 carries an adjustable stop $31^a$ to regulate the length of the tape to be fed forward. As shown, this stop comprises an L-shaped plate having longitudinally arranged slots, as $31^b$, through which binding screws, as $31^c$, pass for securing the stop to the block 31. The short arm of the plate $31^a$ is arranged to engage the upturned end of the bracket 29, when the block 31 is returned by the springs after feeding the tape forward. When it is desired to feed a long piece of tape, the screws, as $31^c$, are loosened and the plate moved forward and fastened by tightening up the screws $31^c$; and to shorten the tape fed, the reverse operation takes place, the plate or stop $31^a$ being moved backward and secured in the desired position by the screws $31^c$.

The lever 32 is actuated to move the sliding block 31 of the tape feeding device forward by means of a cam 91 on the shaft 100, and this cam is so constructed as to operate the lever 32 to move the tape forward after a section has been glued to the stays and cut, and the completed stays discharged from the presser block 2.

A suitable mechanism is arranged to discharge the stays from the face of the presser block into a suitable tray or receptacle 55 arranged in front of said pressing member 2 just after the plunger has begun its ascent. This discharge mechanism preferably comprises two arms or members 44, 45 projecting laterally from the arm 46 of an L-shaped member 47 and arranged to operate on opposite sides of the plunger 11 and over the face of the pressing member 2. A sliding block or member 48 is connected with the other arm of the member 47 and slides on rods, as 48′, supported in a bracket 49, similar to the bracket 29 of the tape feeding device with springs, as 50, arranged thereon to return the block after actuation. A link 51 is connected at one end with the sliding block 48 and at its free end with a lever 52 fulcrumed near its upper end at 53 to the supporting structure and carrying a roller 54 at its upper end. The horizontally disposed shaft 100 is rotatably sustained by the frame or supporting structure adjacent the upper or fulcrumed ends of the levers 32 and 52, and this shaft is provided with cams 91 and 92 which are so positioned thereon as to engage the rollers on the levers 32 and 52 and impart an oscillatory movement to the lower ends of the levers 32 and 52 when the shaft is rotated.

A particular feature of the invention resides in forming the top or upper plate of the pressing block in two sections and supporting it on auxiliary cushioning means to provide for the movement thereof relatively to each other to permit the same pressure to be applied on the two stay sections that are to be joined when such sections are of uneven thicknesses. As the tendency of the springs 7 is to maintain the pressing block in an elevated position, it will also be perceived that pressure will be applied to the adhesive tape and stay sections during the descent of the pressing member as well as after it has reached the bed plate.

It will also be noted that as soon as the pressure has been released from the pressing member it will be returned to its normal or initial position by the springs 7 ready for the next operation.

In practice, the stay sections are arranged over the face of the pressing member. The feeding mechanism is so timed as to feed the tape forwardly over the stay sections; the plunger then descends, the finger 17 of the slide 16 grips the tape and retains it in position before the plunger has reached the pressing block. As the die 12 carried by the plunger engages the front face of the die 14 of the bed plate, a section of the tape is severed from the roll. This severed portion of the tape is then pressed against the stay sections by the plunger 11. Because of the construction of the pressing block, pressure is not only applied to the tape after said member has contacted with the bed plate, but during the entire time consumed by the downward movement of the pressing member. The discharging mechanism is so timed that after the pressing member has returned to its normal or initial position and the plunger slightly elevated above the same, the joined stay sections will be discharged into the tray or receptacle 55 at the front of the machine.

A counting device for the spliced stays is also mounted on the machine and as illustrated comprises an L-shaped bracket 56 secured in any suitable manner to the machine, preferably by screws, as 57, passing through one arm of said bracket. Fulcrumed on the other arm is a lever 58 having an arm 59 projecting upwardly from one end in position to be engaged by the roller 59′ on the cam 92 on the operating shaft 100. This roller 59′ is arranged to actuate the arm 59 simultaneously with the actuation of the discharge mechanism by the cam 92. A pawl 61 is pivoted to the other end of said lever 58 with a spring 62 bearing thereagainst and holding it in engagement with a toothed disk, or dial 65, rotatably mounted on said bracket.

A spring 63 bears against the lower face of the lever 58 and holds it in operative position. An adjustable stop 64 is arranged below and bears on said lever 58. The dial 65 has ratchet teeth around its periphery and numbers corresponding to said teeth arranged on its front face. This dial is also provided with a plurality of holes, as 66, into which a screw stud 67 is adapted to be placed so that when the pointer 68 at the front of the dial registers the desired number, say, for instance, fifty, a bell will be rung through means now to be described.

A striker or clapper 70 is pivoted to the bracket 56 and has an arm or tooth 71 projecting over the rear face of the dial in position to be engaged by the screw stud 67 which causes the weighted end of said clapper to strike the bell 69 and indicate that a certain number of stays have been spliced. The bell 69 is arranged adjacent the dial 65 preferably on a plate 72 depending from the bracket 56.

It will thus be seen that simultaneously with the actuation of the lever 52 to discharge the completed stay, the roller 59′ on cam 92 moves the arm 59 of lever 58 and the pawl 61 is caused to move the dial 65 one tooth which movement of the dial is indicated on the face thereof by the pointer 68.

Having described my invention, I claim:—

1. A device of the character specified, embracing a bed plate, a pressing member yieldably sustained above said plate and constructed to permit stay sections of unequal thicknesses to be joined and to receive equal pressure, means for intermittently feeding an adhesive tape over the face of the pressing member, a plunger adapted to depress the presser member on the bed plate, and a die carried by the plunger for severing a portion of the tape.

2. In a device of the character described, the combination with a bed plate, of a presser member yieldably sustained above the same, a plunger adapted to depress the presser member, means for intermittently feeding an adhesive tape across the face of the presser member, means carried by the plunger for gripping or engaging the tape during the descent and ascent of the presser member, and a die carried by the plunger for severing a portion of the tape at each downward stroke of the plunger, and discharging mechanism for discharging the work from the presser member.

3. In a machine of the character described, the combination with a machine bed having a bed plate, of a supporting structure for the machine bed, a presser member yieldably sustained above the bed plate, an upright extension formed on the machine bed adjacent the rear side of the presser member, mechanism for intermittently feeding an adhesive tape across the face of the presser member, a plunger adapted to depress the presser member, a spring-pressed slide carried by the plunger, the lower end of the slide projecting below the plunger and having a finger for engaging the tape and said upright extension of the machine bed, and a die carried by the plunger for co-acting with said extension to sever a portion of the tape at each downward stroke of the plunger.

4. In a machine of the character specified, the combination with a bed plate, a presser member yieldably sustained above said plate, said member comprising two vertically spaced horizontally disposed plates, the upper being formed of two sections, guiding means for the presser member, means for intermittently feeding an adhesive tape across the face of the presser member, a plunger adapted to depress the presser member, and a die carried by the plunger for severing a portion of the tape at each downward stroke or movement of the plunger, with actuating means for the plunger.

5. In a machine of the character specified, the combination with the machine bed plate, of a presser member yieldably sustained above said plate, said member comprising two vertically spaced plates, the upper of which is formed of two sections, and upright springs fixed to the bed plate arranged to work through corresponding apertures or openings in the lower presser member plate and fixed to the upper presser member plate, means for connecting the sections comprising the upper plate of the presser member with the lower plate of such member, but permitting such sections to move relatively to each other and to the lower presser member plate, guiding means for the presser member, means for intermittently feeding adhesive tape across the face of the presser member, a plunger adapted to depress the presser member, and a die carried by the plunger for severing a portion of the tape at each downward stroke or movement of the plunger.

6. In a machine of the character specified, the combination with a machine bed plate of a presser member yieldably sustained above said plate, said member comprising two vertically spaced horizontally disposed plates or members, the upper of which is formed of two sections, vertically disposed resilient elements fixed at their inner ends to the bed plate extending through corresponding openings or apertures in the lower presser member plate and fixed at their opposite ends to the sections forming the upper presser member plate, means for so connecting the presser member plates as to permit the sections forming the upper plate to move relatively to the lower plate, and guiding means for the presser member.

7. In a stay-joining machine, the combination of a bed plate, a yielding pressing member arranged thereon, a plunger arranged above said pressing member, automatic means for intermittently feeding an adhesive tape over the face of said pressing member, means for severing said tape after the feeding thereof, and automatic means for discharging the spliced stays from the machine.

8. In a device of the class described, the combination of a bed plate, a pressing member yieldably sustained above said plate, means for intermittently feeding a tape over the face of said pressing member, a plunger adapted to depress the presser member on the bed plate, a die carried by the plunger for severing a portion of the tape and means for gripping the tape during the descent and ascent of the presser member.

9. A stay joining machine having a pressing member, automatic means for intermittently feeding a tape over said pressing member and comprising a slidably mounted member provided with tape engaging means, a spring arranged to normally hold and return said member into normal position, and a cam operated lever connected with said sliding member for moving it forward intermittently.

10. A stay joining machine having a pressing member, automatic means for intermittently feeding a tape over said pressing member comprising a slidably mounted member provided with tape engaging means, a spring arranged to normally hold and return said member into normal position, a cam operated lever connected with said sliding member for moving it forward intermittently, and means carried by said sliding member to regulate the length of the piece of tape to be fed forward.

11. A stay joining machine having a pressing member, automatic means for intermittently feeding tape over said pressing member comprising a slidably mounted member provided with tape engaging means, a spring arranged to normally hold and return said member into normal position, and a cam operated lever connected with said sliding member for moving it forward intermittently, and an adjustable stop carried by said sliding member to regulate the length of the tape to be fed forward.

12. A stay joining machine having a pressing member, automatic means for intermittently feeding tape over said pressing member comprising a slidably mounted member provided with tape engaging means, a spring arranged to normally hold and return said member into normal position, a cam operated lever connected with said sliding member for moving it forward intermittently, and an adjustable stop carried by said sliding member to regulate the length of the tape to be fed forward and composed of an L-shaped plate having longitudinally arranged slots in one arm and screws passing through said slots and engaging said sliding member.

13. A stay joining machine having a pressing member, automatic means for intermittently feeding tape over said pressing member, comprising a slidably mounted member provided with tape engaging means, a spring arranged to normally hold and return said member into normal position, a cam operated lever connected with said sliding member for moving it forward intermittently, a rotary shaft, and a cam carried by said shaft arranged to engage one end of said lever to swing it on its fulcrum and move said sliding member forward.

14. A stay joining machine having a pressing member, automatic means for intermittently feeding a tape over said pressing member comprising a bracket provided with guides, a block slidable on said guides, tape engaging means carried by said block, springs arranged on said guides to normally hold and return said block into normal position and a lever connected to move said block intermittently against the tension of its spring.

15. In a stay joining machine, the combination of a bed plate, a yielding pressing member mounted thereon, a plunger supported above said pressing member and provided with tape severing means, automatic means for intermittently feeding a tape over said pressing member and means for discharging the work from the pressing member comprising a sliding member provided with arms arranged to operate on opposite sides of said plunger over the face of the pressing member to engage the completed stays and eject them from said pressing member, means for actuating said sliding member and means for returning said member after actuation.

16. In a stay joining machine, the combination of a bed plate, a yielding pressing member mounted thereon, a plunger supported above said pressing member and provided with tape severing means, automatic means for intermittently feeding a tape over said pressing member and means for discharging the work from the pressing member comprising a sliding member provided with arms arranged to operate on opposite sides of said plunger over the face of the pressing member to engage the completed stays and eject them from said pressing member, a lever connected with said sliding member and a rotary shaft provided with means for operating said plunger, said tape feeding means and the lever of said discharge means.

17. In a stay joining machine, the combination of a bed plate, a presser member yieldably sustained above said plate, a plunger adapted to depress the presser member, means for intermittently feeding a tape across the face of the presser member, means carried by said plunger for gripping the tape during the descent and ascent of the presser member and a die carried by the plunger for severing the tape at each down stroke of the plunger.

18. In a stay joining machine, the combination of a bed plate, a presser member yieldably sustained above said plate, said member comprising two vertically spaced horizontally disposed plates, yielding means arranged between said plates, means for intermittently feeding tape over said pressing member, a plunger adapted to depress the presser member and a die carried by the plunger for severing a portion of the tape.

19. A machine of the class described having, in combination, a yielding pressing member constructed to permit stay sections of unequal thickness to be joined and to receive approximately equal pressure, means for feeding a piece of adhesive tape across said pressing member, a plunger, and means for producing relative movement between said member and plunger.

20. A machine of the class described having, in combination, a bed plate, a pressing member yieldably sustained above said plate and constructed to permit stay sections of unequal thickness to be joined and to receive equal pressure, means for intermittently feeding an adhesive tape over the face of the pressing member, a plunger arranged to coöperate with the pressing member, and means for cutting off a portion of the tape.

21. A machine of the class described comprising a support for the abutting ends of stays, mechanism to feed a strip of adhesive tape, means to sever a piece therefrom, a member arranged to press said severed piece of tape upon the abutting end portions of the stays, and means to impart an approximately uniform pressure upon the abutting ends of stays irrespective of variations in the thickness of said ends.

22. A machine to join the end portions of stays by adhesive means comprising upper and lower pressing mechanism constructed and arranged to press the end portions of stays between them whereby said end portions will be united by the adhesive means, and mechanism to remove automatically the united stays from said pressing mechanism.

23. A machine of the class described, comprising a yielding presser member arranged to permit stay sections of unequal thicknesses to receive approximately equal pressure during the operation of the machine, means to feed intermittently an adhesive tape over the abutting ends of the stays, and a plunger movable to press said tape upon the stays.

24. A machine of the class described, comprising a yielding presser member for engaging abutting end portions of stays, constructed and arranged to compensate automatically for different thicknesses in the abutting ends of the stays, a plunger relatively movable toward said presser member, and means to feed adhesive material between the plunger and said presser member.

In testimony whereof I have signed my name to the specification in the presence of two subscribing witnesses.

FREDERICK L. ANDERSON.

Witnesses:
JAMES R. HODDER,
FREDERICK L. EDMONDS.

Copies of this patent may be obtained for five cents each, by addressing the "Commissioner of Patents. Washington, D. C."